US008423764B2

(12) United States Patent
Amendola et al.

(10) Patent No.: US 8,423,764 B2
(45) Date of Patent: Apr. 16, 2013

(54) METHOD AND APPARATUS FOR KEY REVOCATION IN AN ATTRIBUTE-BASED ENCRYPTION SCHEME

(75) Inventors: Raffaele G. Amendola, West Chicago, IL (US); Matthew G. Pirretti, Huntley, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 402 days.

(21) Appl. No.: 12/821,528

(22) Filed: Jun. 23, 2010

(65) Prior Publication Data

US 2011/0320809 A1 Dec. 29, 2011

(51) Int. Cl.
*H04L 9/00* (2006.01)
(52) U.S. Cl.
USPC .......................................................... 713/158
(58) Field of Classification Search ........................ None
See application file for complete search history.

(56) References Cited

U.S. PATENT DOCUMENTS

| | | | |
|---|---|---|---|
| 2003/0081785 A1 | 5/2003 | Boneh et al. | |
| 2005/0084100 A1* | 4/2005 | Spies et al. ..................... | 380/30 |
| 2008/0016341 A1 | 1/2008 | Staddon et al. | |
| 2008/0034204 A1 | 2/2008 | Lakshminarayanan | |

OTHER PUBLICATIONS

Piretti (Piretti et al. Secure Attribute-Based Systems, AMC 1-59593-518-5/06/0010, Nov. 2006).*

Bethencourt, et al. "Ciphertext-Policy Attribute-Based Encryption," In Proceedings of the 2007 IEEE Symposium on Security and Privacy, 2007, pp. 321-334.
Pirretti, et al., "Secure Attribute-Based Systems," In: ACM Conference on Computer and Communications Security. 2006, pp. 99-112.
Boldyreva, et al. "Identity-Based Encryption with Efficient Revocation," In: CCS '08: Proceedings of the 15th ACM Conference on Computer and Communications Security, Alexandria, Virginia, USA. New York, NY, USA: ACM, 2008, pp. 417-426.
Hanaoka, et al., "Identity-Based Hierarchical Strongly Key-Insulated Encryption and Its Application," In: ASIACRYPT 2005. 2005, pp. 495-514.
International Search Report and Written Opinion for counterpart International Patent Application No. PCT/US2011/040620 mailed on Feb. 24, 2012.
Ibraimi, L., et al., "Ciphertext-Policy Attribute-Based Threshold Decryption with Flexible Delegation and Revocation of User Attributes," Internal Report, 2009, University of Twente, Centre for Telematics and Information Technology.
Roy, S., and Chuan, M., "Secure Data Retrieval Based on Ciphertext Policy Attribute Based Encryption (CP-ABE) System for the DTNs," Lehigh CSE Technical Report, May 2009.

* cited by examiner

*Primary Examiner* — Peter Poltorak
(74) *Attorney, Agent, or Firm* — Steven A. May

(57) ABSTRACT

A method and apparatus for key revocation in an attribute-based encryption scheme is provided herein. Prior to operation, a key management service performs a randomized setup algorithm resulting in the generation of public parameters and the key management service's master secret, MK. During operation, the key management service is provided with verified user attribute information. The key management service creates keys for users based on their list of attributes. The keys can then be used to decode appropriate ciphertext. During the key creation, each attribute is associated with a particular text string. As attributes are revoked, the text string is updated.

19 Claims, 5 Drawing Sheets

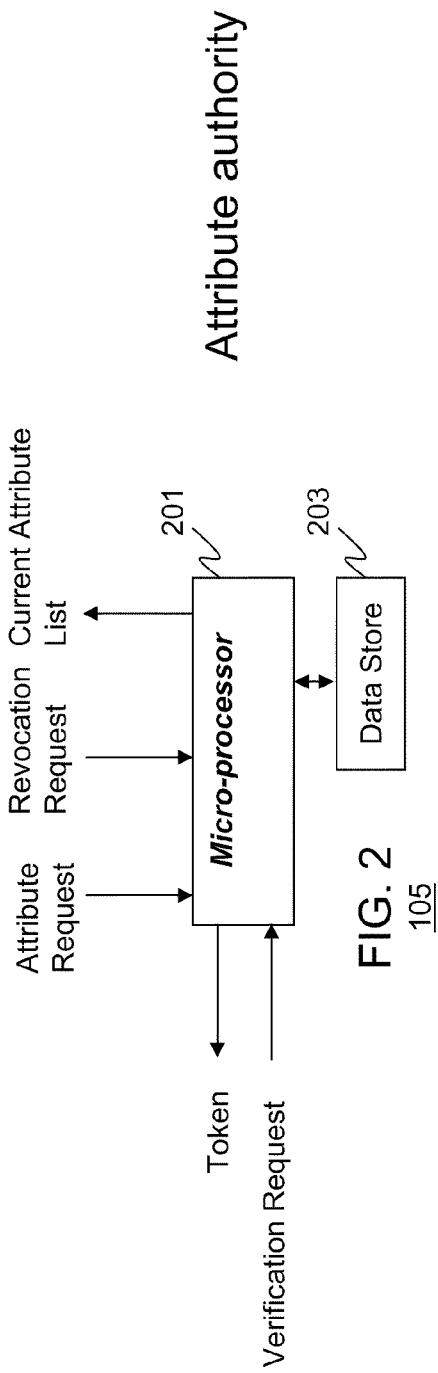
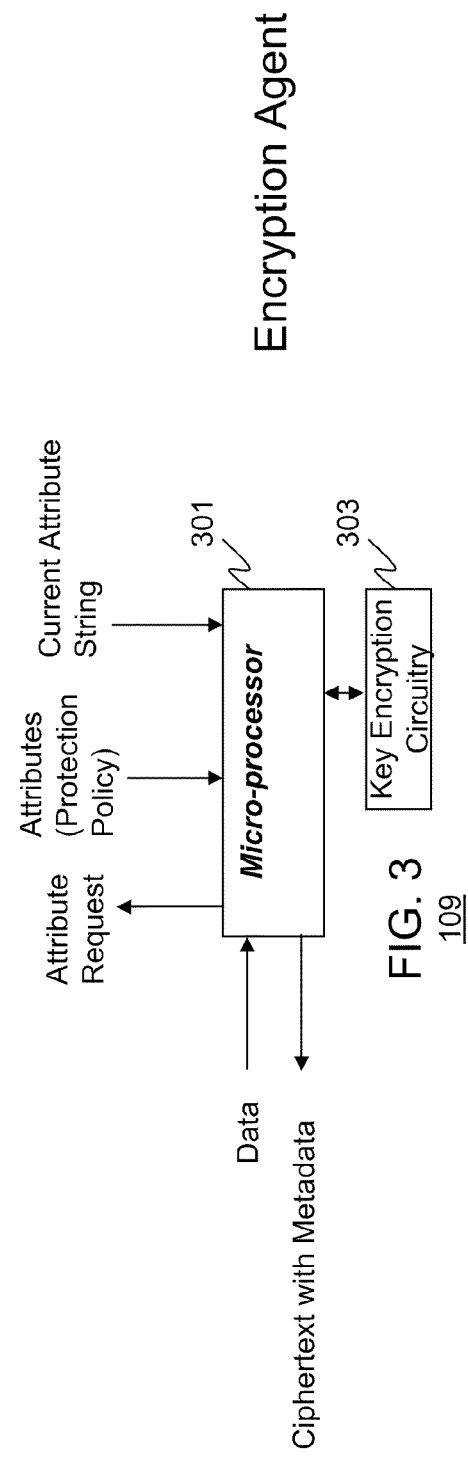

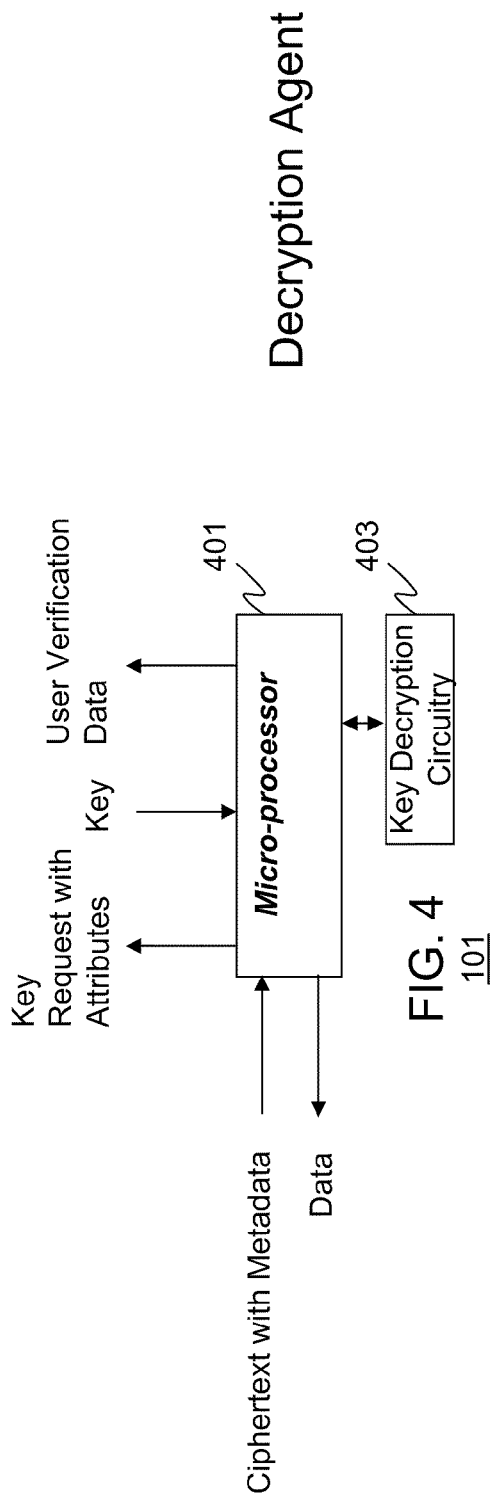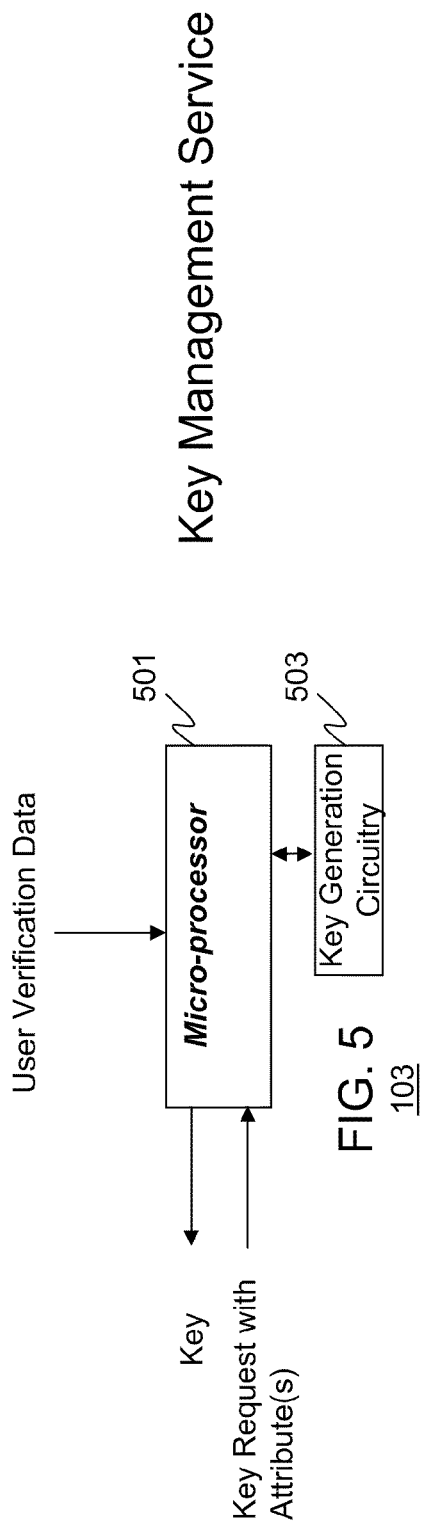

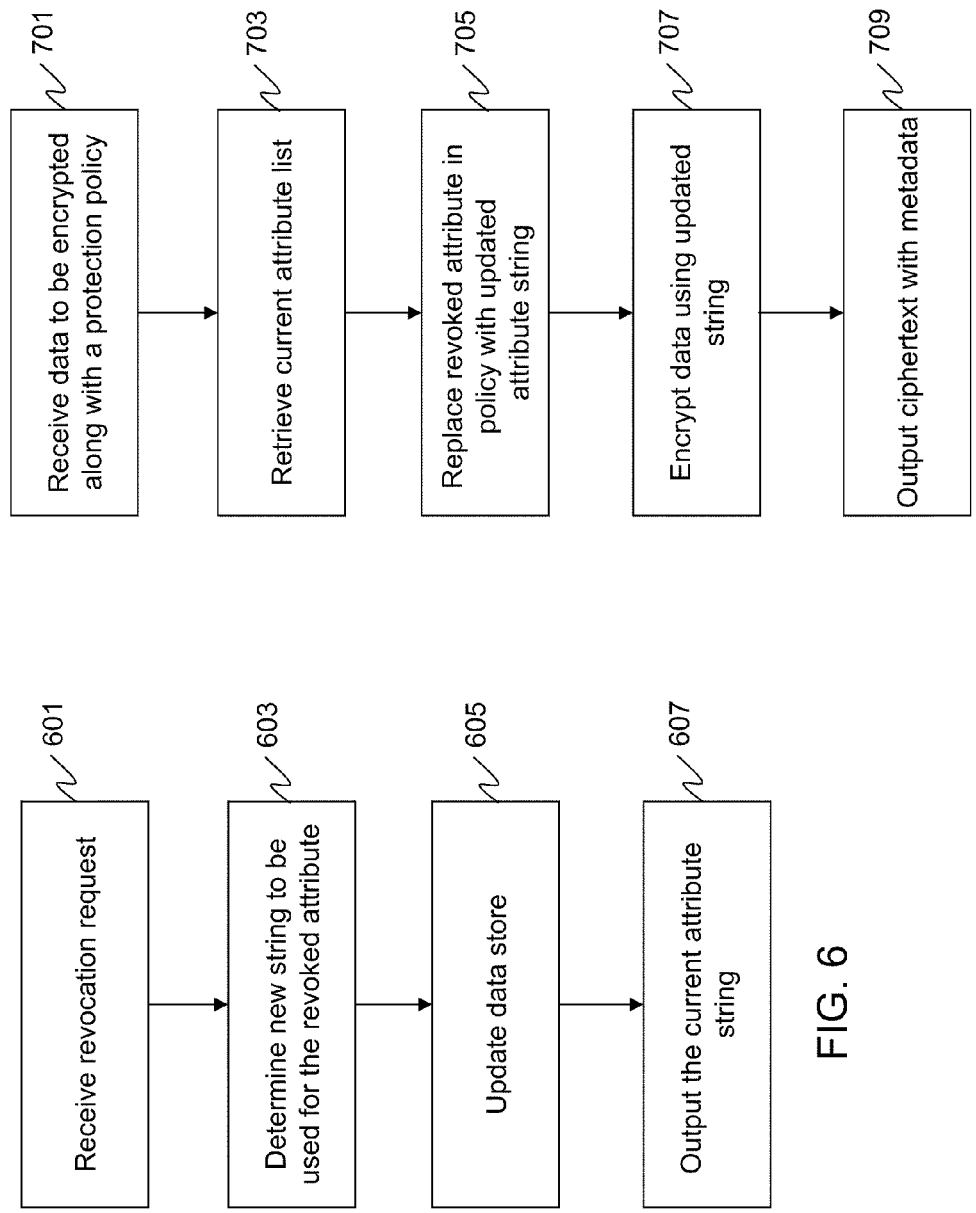

METHOD AND APPARATUS FOR KEY REVOCATION IN AN ATTRIBUTE-BASED ENCRYPTION SCHEME

FIELD OF THE INVENTION

The present invention relates generally to an attribute-based encryption scheme and in particular, a system and method for supporting key revocation in an attribute-based encryption scheme.

BACKGROUND OF THE INVENTION

Attribute-Based Encryption (ABE) schemes use attribute strings directly in the cryptographic operations used to protect data. A user constructs a data protection policy combining threshold gates with attribute strings. The semantic of a threshold gate in this context indicates that the encryptor specifies n attributes and a threshold value k that is in the interval [1,n]. A decryptor must possess at least k of the specified attributes. Such threshold gates may be combined to express complex policies. As a special case we note that the Boolean operators AND (an n out of n threshold gate) and OR (a 1 out of n threshold gate) may be employed. More particularly, in an attribute-based encryption scheme, a decryption key for the user is created from random information specific to the user along with user attribute information, and system instance data. Examples of attributes may include a user's name, e-mail address, organizational duties, status, etc.

An example of a protection policy expression may be "'Manager' OR 'Engineer'". This states that users possessing either the Manager attribute or the Engineer attribute should be allowed to decrypt the resultant ciphertext. The decryption key granted to a user contains parameters that directly utilize these attribute strings. The ability of a user to decrypt ciphertext is based on the set of attributes assigned to them and the protection policy assigned to the data. Also, while multiple people may have the key to decrypt the corresponding ciphertext, each user's key is associated with that user. For example, even though Alice and Bob have been assigned the Manager attribute and they may both decrypt data for Managers, Alice's 'Manager' key will be different from Bob's 'Manager' key. One of the benefits of this type of scheme is that users can protect data based on the desired qualifications of the intended recipients with minimal pre-setup.

A system employing such a scheme needs to support use cases where an attribute is revoked for a user and should no longer be used in the protection of new data. A typical case where this would become necessary is if a user was previously authorized for an attribute but no longer qualifies for the attribute assignment. A user may leave the company, change departments, be reassigned to a different project, etc. There needs to be some provision for continuing the intent of the attribute without compromising future data. For example, an organization still wants to use the 'Legal Department' qualification to encrypt data but needs to address the fact that users who were once in the Legal Department are no longer in that department. Therefore a need exists for a method and apparatus for key revocation in an attribute-based encryption scheme that allows for an attribute to still be utilized, yet still adequately protects data.

BRIEF DESCRIPTION OF THE DRAWINGS

FIG. 2. is a block diagram of an attribute authority of FIG. 1.
FIG. 3. is a block diagram of an encryption agent of FIG. 1.
FIG. 4 is a block diagram of a decryption agent of FIG. 1.
FIG. 5 is a block diagram of a key management service of FIG. 1.
FIG. 6 is a flow chart showing the operation of attribute authority of FIG. 2.
FIG. 7 is a flow chart the showing operation of the encryption agent of FIG. 3.

Figure 1:
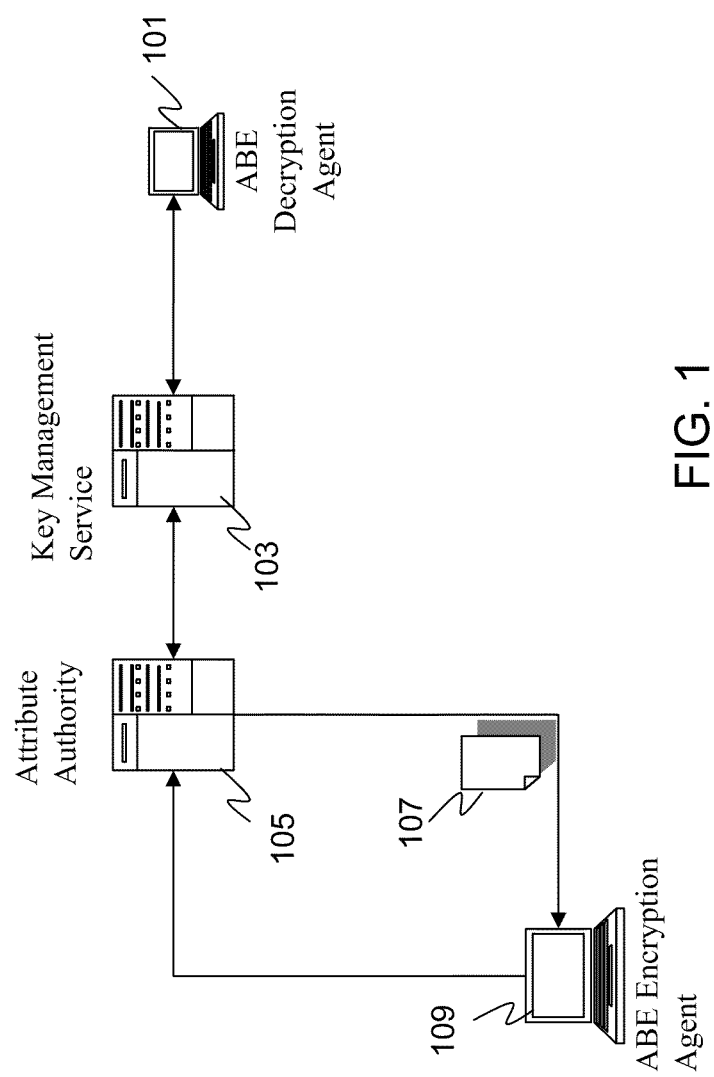
FIG. 1 is a block diagram of an encryption system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for key revocation in an attribute-based encryption scheme is provided herein. Prior to operation, a key management service performs a randomized setup algorithm resulting in the generation of public parameters and the key management service's master secret, MK. During operation, the key management service is provided with verified user attribute information. The key management service creates keys for users based on their list of attributes. The keys can then be used to decode appropriate ciphertext. During the key creation, each attribute is associated with a particular text string. As attributes are revoked, the system allows for the intent of the attribute to be carried forward and creates a level of indirection and modifies the underlying string representation.

In a particular embodiment, a lineage for each attribute is created through the use of revocation identifiers implemented as a monotonically increasing counter. These revocation identifiers will be appended to an attribute and only the current revision of an attribute will be used in the protection of data after a certain future point in time.

The present invention provides for a method for key revocation in an attribute-based encryption system. The method comprises the steps of receiving a revocation request for a particular attribute, updating a string used for key creation (the string is used for key creation in an attribute-based encryption), and providing the updated string to an encryption agent.

The present invention additionally encompasses an apparatus comprising logic circuitry receiving a revocation request for a particular attribute, updating a string used for key creation, wherein the string is used for key creation in an attribute-based encryption, and the logic circuitry providing the updated string to an encryption agent. The apparatus additionally comprises a data store coupled to the logic circuitry for storing the updated string.

The present invention additionally encompasses a system for encrypting data. The system comprises an attribute authority responsible for managing attributes and attribute assignments by maintaining a list of strings used for attributes and making that list available to system participants, wherein the attribute authority updates the string used for an attribute when requested to do so. The system additionally comprises an encryption agent for encrypting the data based on the strings used for attributes.

There are several attribute-based encryption (ABE) schemes. For discussion purposes, an ABE scheme described by J. Bethencourt, et al., in "Ciphertext-Policy Attribute-Based Encryption", Proceedings of the 1007 IEEE Symposium on Security and Privacy, pages 321-334, 1007 (incorporated by reference herein) will be utilized. As an example of the use of ABE in a real-life scenario consider the following:

Bob and Charlie are system users and each has been assigned the following set of attributes: {Project_Alpha, Manager, Engineer}. Alice is the project manager for Project Alpha and regularly releases sensitive documents that should only be available to engineers on her project team. The data is protected with the policy expression "'Engineer' AND 'Project_Alpha'". Each encrypted data object is encrypted using a key that allows users with attributes 'Engineer' AND 'Project_Alpha' to decrypt. Bob has recently been assigned to a new project and is no longer associated with Project Alpha. He should not be able to decrypt future documents that require the Project_Alpha attribute.

In order to address this issue, ABE encryption agent 109, ABE decryption agent(s) 101, Attribute Authority 105, and a Key Management Service 103 are provided (FIG. 1). Key Management Service 103 is responsible for generating cryptographic keys that are tied to user attributes and can be used to decrypt data that has been protected under this scheme. Attribute Authority 105 is responsible for managing attributes and attribute assignments and for authenticating or verifying the authentication of users. As part of the attribute management responsibilities, attribute authority 105 will maintain a list of valid attributes and make that list available to system participants.

Attributes that have been revoked will be marked and a replacement attribute string, representing the attribute, will be designated. ABE encryption agent 109 is responsible for verifying that the attributes used in the protection policy expression are indeed valid, and for encrypting the data. ABE encryption agent 109 will periodically or prior to each encryption session, contact the attribute authority 105 and retrieve a list of valid attributes. This list will include any revoked attributes and the next valid version of the attribute that should be used in its stead. ABE decryption agent(s) 101 is responsible for parsing the protection policy for protected content, contacting the key management service and requesting the decryption key for any revoked attributes, and decrypting the protected content. It should be noted that although FIG. 1 shows these elements as separate entities, the elements shown in FIG. 1 may not necessarily be separate entities. Conversely, there may be several physical or logical entities acting as any of the elements depicted in FIG. 1.

In one embodiment, the revocation process begins when attribute authority 105 is notified that a user, Bob in this example, no longer possesses an attribute (e.g. the Project_Alpha attribute). In another embodiment, the revocation process may be a periodic event (e.g. every day). Attribute authority 105 will update the valid attribute list and create the next revision of the revoked attribute. One instantiation of this list may be a time stamped, digitally signed XML file. A new attribute value (associated with the attribute) will be created by appending a revocation identifier to the base attribute value or, if the base attribute has already been revoked, a revocation identifier will be updated to the next attribute revision. An attribute may be entirely revoked. In our example, a monotonically increasing counter will be used as the revocation identifier, hence Project_Alpha will become Project_Alpha_2. If Project_Alpha_2 is revoked, Project_Alpha_3 will become the new valid attribute. This list may be pulled by ABE encryption agent 109 or it may be pushed out. ABE encryption agent 109 may check for a new list prior to each encryption or it may do so periodically in accordance with the established policy. At some point in time after the Project_Alpha attribute has been revoked, Alice sends out a new protected document.

Alice creates a new document containing sensitive information and wants to share the document only with engineers on her team. Alice will assign a protection policy of "'Engineer' AND 'Project_Alpha'" to the document. ABE encryption agent 109, will verify the policy string (i.e., the string used for the particular protection policy) and recognize that 'Project_Alpha' has been revoked and 'Project_Alpha_2' should be used as a string during encryption in its place. Note that Alice may not necessarily need to be aware that the next revision of the attribute is being utilized. The ABE encryption agent 109 may update an internal data store to reflect the next valid revision of the attribute.

If the complete attribute lineage has been revoked, the user, Alice in this case, will be notified by the ABE encryption agent 109 and the encryption process will be halted. This may occur if no users are assigned the attribute and no users will ever be assigned the attribute. For example, if each user is assigned a unique (space and time) user identifier and the user leaves the company, then that attribute should not be used again to protect information. As part of the encryption process, metadata is output with the ciphertext. The metadata indicates the current string being used for the attribute. Now that the document has been encrypted and the metadata created, both using the next valid revision of the attribute, there needs to be a process for allowing authorized users to decrypt the document.

Consider the following example, Charlie is still an engineer working on Project Alpha and should be able to decrypt document 107. Charlie retrieves document 107 and the metadata and determines a key is needed for the attribute Project_Alpha_2. A key is obtained from key management service 103. Charlie presents his credentials and the required attributes to key management service 103. The key is created with the current string representing Project_Alpha (Project_Alpha_2).

More particularly, ABE decryption agent 101 contacts attribute authority 105 and requests authorization for the Project_Alpha_2 attribute. If Charlie is still a legitimate holder of the Project_Alpha attribute, which he is, attribute authority 105 will provide the ABE decryption agent 101 with a secure token that can be presented to key management service 103 in order to receive a new attribute decryption key. Note that key management service 103 does not need to generate an entirely new decryption key for Charlie. Charlie only needs a subset of the decryption key for the Project_Alpha_2 attribute; the decryption key elements for the Project_Alpha_2 attribute may be added to his decryption key. This is more efficient than requiring that the entire decryption key be discarded and a new one be generated and sent to the user. When the ABE decryption agent 101 presents the secure token to key management service 103, key management service 103 will create an attribute decryption key and send it to Charlie. Note that attribute authority 105 could also directly notify key management service 103 of the revocations. Key management service 103 can push out the new attribute decryption keys to each user or store the new attribute decryption keys for a pull from the users, such as in a user's mailbox (as shown in FIG. 1).

Bob may still be able to gain access to the ciphertext. For example, Alice may have forgotten to remove Bob from her email distribution list and he, therefore, also received the document (in protected form). If Bob contacts attribute authority 105 to request authorization for the Project_Alpha_2 attribute, attribute authority 105 will deny the request since Bob is no longer a valid holder of the Project_Alpha attribute. Since Bob does not have the decryption key for the Project_Alpha_2 attribute, he will not be able to decrypt the document. The fact that Bob is still a valid holder of the Engineer attribute does not help him in decrypting the document.

Note that an organization may wish to batch the assignment of the new attribute value if a number of users will be having their attribute revoked over a short period of time. For example, if organizational restructuring results in many users going through job changes, it may be desirable to wait for the changes to be processed prior to assigning the next revision of the attribute. The next revision of the attribute value may be employed in a protection policy prior to the granting of the attribute, but no one will be able to decrypt the document until they receive their new assignment.

In accordance with the organizational policy, the system may periodically purge old attributes and ensure that older documents are protected with current attributes.

FIG. 2. is a block diagram of an attribute authority of FIG. 1. As shown, attribute authority 105 comprises logic circuitry 201, and data store 203. The primary responsibility of attribute authority 105 is to manage attribute strings and to authenticate or verify the authentication of users. More particularly, attribute authority 200 maintains a list of valid and revoked attribute strings and makes that list available to an authorized system participant, updates the attribute string used for a revoked attribute.

Logic circuitry 201 comprises a digital signal processor (DSP), general purpose microprocessor, a programmable logic device, or application specific integrated circuit (ASIC) and is utilized to accesses and control data store 203, determine a current string for an attribute, verify a user's identity, and provide verification and the current string to requesting entities. Embodiments of data store 203 include but are not limited to standard random access memory, secondary storage, and a data store. Data store 203 is used to store information related to the current string being used for a particular attribute as well as storing information on individuals associated with the attribute. It should be clear that data store 203 could be contained within the same physical entity as logic circuitry 201 or may be contained within separate system(s).

During the management of the current strings associated with an attribute, logic circuitry 201 will receive a revocation request for a particular attribute. Considering the example given above, Bob may no longer possess the attribute "Project_Alpha", when this happens a revocation request may be received by logic circuitry 201 regarding Project Alpha. When this occurs, logic circuitry will determine a new string to be used for Project Alpha, and update data store 203 accordingly. As discussed above, if a counter is being used, and if the string "Project_Alpha" is being used for the attribute, then Project_Alpha will become Project_Alpha_2. If Project_Alpha_2 is revoked, Project_Alpha_3 will become the new valid attribute string for Project_Alpha. Logic circuitry 201 will then update data store 203 accordingly.

Attribute authority 105 may periodically push the current attribute list to an authorized system participant (e.g., encryption agent 109), or may be requested by encryption agent 109 for the current attribute list. When an attribute request is received by attribute authority 105, the request may be for a specific set of attributes or for the entire list of attributes. Logic circuitry 201 accesses data store 203 to determine a current string being used for the attribute, and then outputs the current attribute string to the requesting entity. For example, encryption agent 109 may desire to encrypt a document, and may need to know the current string being used for Project_Alpha. This information will be obtained from attribute authority 105 when requested.

As discussed above, attribute authority 105 also serves for authenticating or verifying the authentication of users. In the process of verification, logic circuitry 201 maintains a data structure mapping the users associated with a particular attribute. A verification request may be made as to whether or not an individual is still associated with the attribute. For example, a request may be received by logic circuitry 201 to determine if Charlie is still a legitimate holder of the Project_Alpha attribute. If so, logic circuitry 201 will output a secure token that can be presented to key management service 103 in order to receive a new attribute decryption key. Logic circuitry 201 may create this token by creating a data object that includes a timestamp, a unique identifier for the user, a unique identifier for the attribute authority, a set or subset of attributes assigned to the user, and a digitally signed cryptographic hash of the data object elements.

FIG. 3 is a block diagram of an ABE encryption agent of FIG. 1. ABE encryption agent 109 comprises logic circuitry 301 and encryption circuitry 303. Both circuitry 301 and circuitry 303 comprise a digital signal processor (DSP), general purpose microprocessor, a programmable logic device, or application specific integrated circuit (ASIC) and are utilized to function as set forth below. ABE encryption agent 109 is responsible for verifying the correctness of the attribute expression and for encrypting the data. During operation, logic circuitry 301 receives data to be encrypted along with a protection policy expression which uses attributes. (It should be noted that for simplicity, only a single attribute is discussed in this example). Logic circuitry 301 then provides an attribute request to attribute authority 105 which verifies that the included attributes have not been revoked. If an attribute has been revoked, the attribute is updated to its current valid revision. This is accomplished by logic circuitry 301 receiving the updated string used for the attribute. It should be noted that if a non-allowed attribute is presented to attribute authority 105, logic circuitry 301 will be made aware of this and no encryption will take place.

After the policy expression has been validated and the current attribute string has been received, the data is ready to be encrypted. Encryption circuitry encrypts the data accordingly and outputs ciphertext with metadata that includes the current attribute strings used for encryption.

In the ciphertext policy embodiment of ABE, the encryptor encodes an encryption policy as an access structure. In one embodiment the access structure is an access tree. In an access tree, attributes are encoded as leaf nodes and interior nodes are associated with threshold gates. An interior node with a threshold of k and n children nodes is said to be satisfied if at least k of its children are satisfied. The root of the tree is constructed such that if the entire tree is satisfied, then the decryptor is able to reconstruct a secret which can be used to decrypt the data.

In the key policy embodiment of ABE the ciphertext, the encryptor encodes their encryption policy as a finite set of attributes. A ciphertext is created by a random process incorporating the data to be encrypted, public parameters and randomized encodings of the attributes. The decryptor may utilize any member of the attribute set contained within the ciphertext. However, the decryptor will only be capable of decrypting ciphertexts that satisfy the access tree contained within their private key. Finally, the encrypted data is output to the requester.

FIG. 4 is a block diagram of decryption agent 101. Decryption agent 101 decrypts ciphertext based on the associated list of attributes and rules. As shown, decryption agent 101 comprises logic circuitry 401 and key decryption circuitry 403. Both circuitry 401 and circuitry 403 comprise a digital signal processor (DSP), general purpose microprocessor, a programmable logic device, or application specific integrated circuit (ASIC) and are utilized to function as set forth below. During operation of decryption agent 101, logic circuitry 401 receives ciphertext and metadata from a user (e.g., Bob). As discussed above, the metadata includes the current string used for an attribute (e.g., Project_Alpha_2). If the user does not have a key for the current iteration of Project_Alpha, then the key must be obtained from key management service 103.

To obtain a correct attribute decryption key, a key request is provided along with user verification data to key management service 103. The current attribute string is provided as part of the key request. In response, the user is verified and a key is obtained. Key decryption circuitry 403 then decrypts the ciphertext using the correct key, and the decrypted data is provided to the user. The correct key may then be stored by the decryption agent until it is again revoked.

FIG. 5. is a block diagram of key management service of FIG. 1. Key management service 103 creates keys for users based on their list of attributes. As shown, key management service 103 comprises logic circuitry 501 and key generation circuitry 503. Both circuitry 501 and circuitry 503 comprise a digital signal processor (DSP), general purpose microprocessor, a programmable logic device, or application specific integrated circuit (ASIC) and are utilized to function as set forth below. During operation of management service 103, logic circuitry 501 receives a key request from a user (e.g., Bob) to create a key to decode ciphertext associated with a particular attribute. The attribute is part of the request. An additional part of the request may comprise additional information that verifies the user's identity (such as a token), and attribute list.

Once logic circuitry 501 receives the request, the authenticity of the requester is verified. Key generation circuitry 503 utilizes a random process and the key management service's master secret MK to produce user keying material SK and the key is then provided to the requester.

In the ciphertext policy embodiment of ABE, the user's attributes are encoded into a finite set. The key generation process utilizes this set to produce SK. In the ciphertext policy embodiment of ABE, SK may consist of per-attribute elements and elements solely based upon public parameters.

In the key policy embodiment of ABE, the user's attributes are expressed within an access structure. An embodiment of an access structure is an access tree. In an access tree attributes can be encoded as leaf nodes and interior nodes are associated with threshold gates. An interior node with a threshold of k and n children nodes is said to be satisfied if at least k of its children are satisfied. The access tree is said to be satisfied if its root is satisfied. In key policy, ABE key generation is a randomized process that produces an access structure, such as an access tree, based upon attributes. Once a key has been generated, it is output to the requester. The key can then be used to decode appropriate ciphertext.

FIG. 6 is a flow chart showing the operation of attribute authority 105 of FIG. 2. At step 601, logic circuitry 201 receives a revocation request for a particular attribute. As discussed, the revocation request indicates that at least one individual is no longer in possession of the attribute. At step 603, logic circuitry 201 then determines and updates a new string to be used for the revoked attribute (e.g., updates an existing string used for key creation). Data store 203 is then updated accordingly by logic circuitry 201 with the new attribute string (step 605). As discussed above, Attribute authority 105 may periodically push the current attribute list to authorized system participants (e.g., encryption agent 109), or may be requested by system participants for the current attribute list. When a push is desired, or an attribute request is received by attribute authority 105, logic circuitry 201 accesses data store 203 to determine a current string being used for the attribute, and then outputs the current attribute string to the requesting entity (e.g., an encryption agent) at step 607.

The above steps may take place numerous times; depending on how many times attributes are revoked. For example, a second revocation request for a particular attribute may be received and the string used for key creation again updated and provided to the encryption agent. As discussed, the updating may simply comprise appending a revocation identifier (e.g., a numeral) to the string used for the attribute, concatenating a revocation identifier (e.g., a monotonic counter) to the string, etc. Again, the updated strings are stored within data store 203.

FIG. 7 is a flow chart showing the operation of the ABE encryption agent of FIG. 3. The logic flow begins at step 701 where logic circuitry 301 receives data to be encrypted along with a protection policy expression which uses attributes. At step 703 logic circuitry 301 retrieves the current attribute list from attribute authority 105. Logic circuitry 301 replaces the revoked attribute used in the policy with an updated string used for the attribute (step 705). Encryption of the data then takes place via encryption circuitry utilizing the current string (step 707). Finally, at step 709 encryption circuitry outputs ciphertext with metadata that includes the current attribute strings used for encryption.

Figure 8:
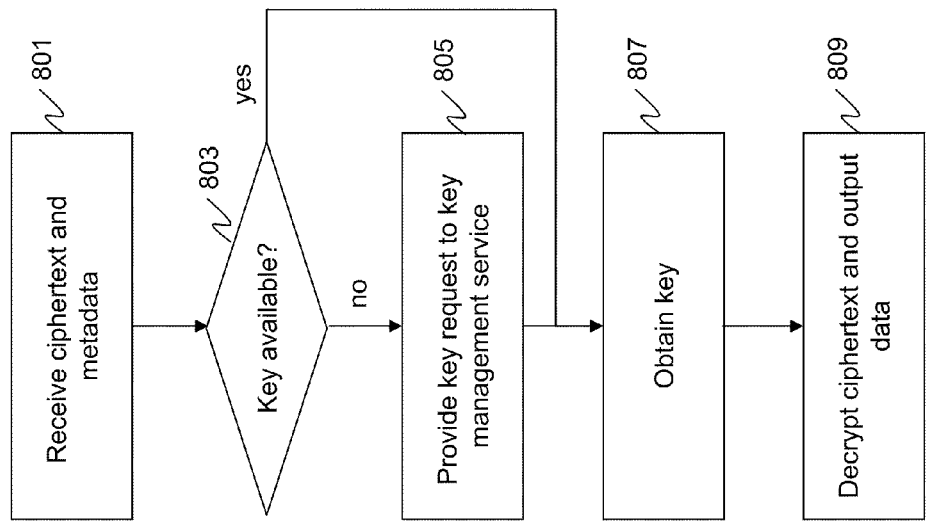
FIG. 8 is a flow chart showing the operation of the decryption agent of FIG. 4.

FIG. 8 is a flow chart showing the operation of the decryption agent of FIG. 4. The logic flow begins at step 801 where logic circuitry 401 receives ciphertext and metadata. At step 803, logic circuitry makes a determination as to whether or not it has access to a key for the attribute included in the metadata. If so, the logic flow continues to step 809, otherwise the logic flow continues to step 805. At step 805 a key request is provided to key management service 103. In response, a key is obtained (step 807). Finally at step 809 the ciphertext is decrypted and data is provided to the user.

Figure 9:
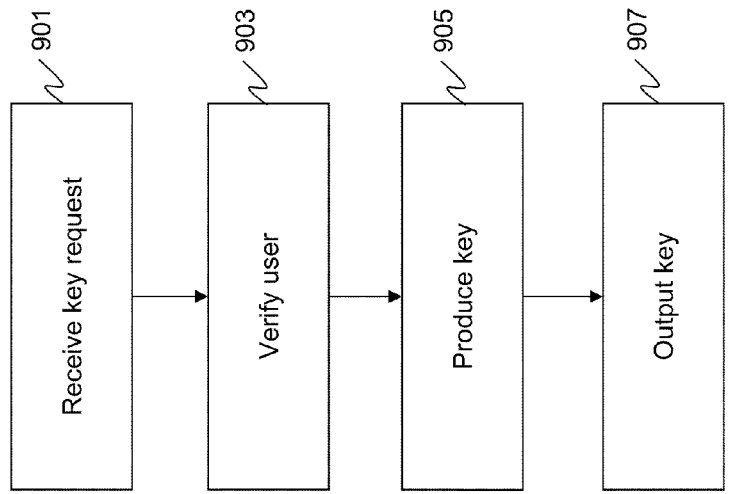
FIG. 9 is a flow chart showing operation of the key management service of FIG. 5.

FIG. 9 is a flow chart showing operation of the key management service of FIG. 5. The logic circuitry begins at step 901 where a key request is received from a user. At step 903 the authenticity of the requester is verified and the logic flow continues to step 905. At step 905, the keys are produced and provided to the requester (step 907).

The above system provides an effective way to manage the revocation of attributes while maintaining the intended use of the attribute. This is critical in ensuring that unauthorized users are unable to access sensitive content. Additionally, the above system supports updating cryptographic keys only when it is necessary (i.e. when an attribute has been revoked), as opposed to requiring a key update when each time period has expired; however, it is also flexible enough to support a time event triggered revocation. The key update process is efficient in that it does not require the generation of a completely new key. It is granular enough to support attribute revocation such that a user who has an attribute that has been revoked may still be a valid holder of other attributes and can still participate in the system with those valid attributes. It also supports user revocation through the revocation of all his assigned attributes. While the invention has been particularly shown and described with reference to a particular embodiment, it will be understood by those skilled in the art that various changes in form and details may be made therein without departing from the spirit and scope of the invention. For example, while only a single decryption agent 101 and encryption agent 109 are shown in FIG. 1, in various embodiments multiple decryption and encryption agents may be present. It is intended that such changes come within the scope of the following claims:

The invention claimed is:

1. A method for attribute revocation in an attribute-based encryption system, the method comprising the steps of:
   receiving, at an attribute authority, a revocation request for a particular attribute of a plurality of attributes shared among a plurality of system users;
   updating, by the attribute authority, an attribute string used for key creation in an attribute-based encryption for the particular attribute, wherein attribute strings associated with other attributes of the plurality of attributes are not updated, wherein the attribute strings associated with the plurality of attributes are used to generate a key, and wherein updating the attribute string permits a user associated with all of the plurality of attributes to decrypt data that is encrypted using the key but not a user that is associated with one or more of the plurality of attributes but that is not associated with the particular attribute; and
   providing, by the attribute authority, the updated attribute string to an authorized system participant using the attribute-based encryption system.

2. The method of claim 1 wherein the authorized system participant comprises an encryption agent that uses the updated attribute string when encrypting the data.

3. The method of claim 1 further comprising the steps of:
   receiving a second revocation request for the particular attribute;
   again updating the attribute string used for key creation; and
   providing the again-updated attribute string to the authorized system participant.

4. The method of claim 1 wherein the step of updating the attribute string comprises the step of concatenating a revocation identifier to the string.

5. The method of claim 4 wherein the revocation identifier comprises a monotonic counter.

6. The method of claim 1 wherein the step of providing the updated attribute string to the authorized system participant comprises the steps of:
   receiving a request from the participant for the updated attribute string; and
   providing the updated string to the participant based on the request.

7. The method of claim 1 wherein the step of providing the updated attribute string to the authorized system participant comprises the step of periodically pushing the updated string to the participant.

8. The method of claim 1 wherein the step of providing the updated attribute string to the authorized system participant comprises the step of providing the updated attribute string to the authorized system participant when requested by the participant.

9. An apparatus comprising:
   logic circuitry receiving a revocation request for a particular attribute of a plurality of attributes shared among a plurality of system users, updating an attribute string used for key creation in an attribute-based encryption for the particular attribute, wherein attribute strings associated with other attributes of the plurality of attributes are not updated, wherein the attribute strings associated with the plurality of attributes are used to generate a key, wherein updating the attribute string permits a user associated with all of the plurality of attributes to decrypt data that is encrypted using the key but not a user that is associated with one or more of the plurality of attributes but that is not associated with the particular attribute, and wherein the logic circuitry providing the updated attribute string to an authorized system participant; and
   a data store coupled to the logic circuitry for storing the updated attribute string.

10. The apparatus of claim 9 wherein the authorized system participant comprises an encryption agent that uses the updated attribute string to when encrypting the data.

11. The apparatus of claim 9 wherein the logic circuitry receives a second revocation request for the particular attribute and again updates the attribute string used for key creation, and provides the again-updated attribute string to the system participant.

12. The apparatus of claim 9 wherein the attribute string is updated by concatenating a revocation identifier to the string.

13. The apparatus of claim 12 wherein the revocation identifier comprises a monotonic counter.

14. The apparatus of claim 9 wherein the updated attribute string is provided to the authorized system participant in response to a received request from the participant for the updated attribute string.

15. The apparatus of claim 9 wherein the updated attribute string is provided to the authorized system participant by periodically pushing the updated string to the participant.

16. The apparatus of claim 9 wherein the updated attribute string is provided to the authorized system participant by providing the updated string to the participant when requested by the participant.

17. A system for managing attribute revocation in an attribute-based encryption scheme, the system comprising:
   an attribute authority responsible for maintaining a list of valid and revoked attribute strings and making that list available to an authorized system participant, wherein the attribute authority updates the attribute string used for a revoked attribute; and
   an encryption agent obtaining the attribute string used for the revoked attribute and using the attribute string when encrypting data, wherein a key is generated based on a plurality of attributes associated with the authorized system participant, wherein attribute strings associated with other attributes of the plurality of attributes are not updated, wherein the updated attribute string permits a user associated with all of the plurality of attributes to decrypt data that is encrypted using the key but not a user that is associated with one or more of the plurality of attributes but that is not associated with the revoked attribute.

18. The system of claim 17 further comprising:
a key management service for generating cryptographic keys using the attribute string, where the keys can be used to decrypt data that has been protected under an attribute-based encryption scheme.

19. The system of claim 17 further comprising:
a decryption agent obtaining the keying material for an updated attribute string and using the keying material when decrypting the data.

\* \* \* \* \*